US008581505B2

(12) United States Patent  
Melanson

(10) Patent No.: US 8,581,505 B2  
(45) Date of Patent: *Nov. 12, 2013

(54) PRIMARY-SIDE BASED CONTROL OF SECONDARY-SIDE CURRENT FOR A TRANSFORMER

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,434

(22) Filed: Sep. 5, 2012

(65) Prior Publication Data

US 2012/0327690 A1    Dec. 27, 2012

Related U.S. Application Data

(63) Continuation of application No. 12/415,830, filed on Mar. 31, 2009, now Pat. No. 8,288,954.

(60) Provisional application No. 61/120,455, filed on Dec. 7, 2008.

(51) Int. Cl.
| | |
|---|---|
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/14 | (2006.01) |
| H05B 41/16 | (2006.01) |
| H05B 41/24 | (2006.01) |

(52) U.S. Cl.
USPC ........ 315/219; 315/206; 315/209 R; 315/254; 315/297

(58) Field of Classification Search
None
See application file for complete search history.

(56) References Cited

U.S. PATENT DOCUMENTS

| 6,229,292 B1 | 5/2001 | Redl et al. |
| 6,724,174 B1 | 4/2004 | Esteves et al. |

(Continued)

FOREIGN PATENT DOCUMENTS

| EP | 0636889 | 1/1995 |
| WO | 2004051834 A1 | 6/2004 |

(Continued)

OTHER PUBLICATIONS

Non-Final OA mailed on Aug. 18, 2011 in parent U.S. Appl. No. 12/415,830.

(Continued)

*Primary Examiner* — Douglas W Owens  
*Assistant Examiner* — Dedei K Hammond  
(74) *Attorney, Agent, or Firm* — Terrile, Cannatti, Chambers & Holland, LLP; Kent B. Chambers

(57) ABSTRACT

A power control system includes a transformer and a controller regulates a current on a secondary-side of the transformer based on a primary-side signal value. In at least one embodiment, the secondary-side current is a current out of a filter coupled to a rectifier and the secondary-side of the transformer and into a load. In at least one embodiment, the primary-side signal value is a sample of a current in the primary-side windings of the transformer. In at least one embodiment, the primary-side signal value represents a sample value of a primary-side transformer current. Proper timing of sampling the primary-side signal value substantially eliminates contributions of a transformer magnetizing current from the primary-side transformer current sample. Sampling the primary-side signal value when contributions of the transformer magnetizing current are substantially eliminated allows at least an average of the secondary-side current to be determined from the primary-side signal value.

20 Claims, 10 Drawing Sheets

(56) References Cited

U.S. PATENT DOCUMENTS

| | | |
|---|---|---|
| 6,940,733 B2 | 9/2005 | Schie et al. |
| 7,099,163 B1 | 8/2006 | Ying |
| 7,102,902 B1 | 9/2006 | Brown et al. |
| 7,145,295 B1 | 12/2006 | Lee et al. |
| 7,276,861 B1 | 10/2007 | Shteynberg et al. |
| 7,310,244 B2 | 12/2007 | Yang et al. |
| 7,388,764 B2 | 6/2008 | Huynh et al. |
| 7,642,762 B2 | 1/2010 | Xie et al. |
| 7,710,047 B2 | 5/2010 | Shteynberg et al. |
| 7,719,248 B1 | 5/2010 | Melanson |
| 7,759,881 B1 | 7/2010 | Melanson |
| 7,804,256 B2 | 9/2010 | Melanson |
| 7,852,017 B1 | 12/2010 | Melanson |
| 8,288,954 B2 | 10/2012 | Melanson |
| 2006/0022916 A1 | 2/2006 | Aiello |
| 2006/0214603 A1 | 9/2006 | Oh |
| 2006/0261754 A1 | 11/2006 | Lee |
| 2006/0285365 A1 | 12/2006 | Huynh |
| 2007/0024213 A1 | 2/2007 | Shteynberg |
| 2007/0170873 A1 | 7/2007 | Mishima |
| 2007/0182338 A1 | 8/2007 | Shteynberg |
| 2007/0285031 A1 | 12/2007 | Shteynberg |
| 2008/0174291 A1 | 7/2008 | Hansson |
| 2008/0224636 A1 | 9/2008 | Melanson |
| 2008/0259655 A1 | 10/2008 | Wei |
| 2009/0284182 A1 | 11/2009 | Cencur |
| 2010/0213857 A1* | 8/2010 | Fan ................ 315/186 |
| 2010/0213859 A1 | 8/2010 | Shteynberg |
| 2010/0238689 A1 | 9/2010 | Fei et al. |
| 2010/0244726 A1 | 9/2010 | Melanson |

FOREIGN PATENT DOCUMENTS

| | | |
|---|---|---|
| WO | 2008004008 A2 | 1/2008 |
| WO | 2010065598 | 10/2010 |

OTHER PUBLICATIONS

Response to Non-Final OA filed in parent U.S. Appl. No. 12/415,830 on Feb. 20, 2012.

Notice of Allowance mailed on Jun. 12, 2012 in parent U.S. Appl. No. 12/415,830.

Brkovic, Milivoje, Automatic Current Shaper with Fast Output Regulation and Soft-Switching, Telecommunications Energy Conference, INTELEC '93. 15th International, Sep. 97-30, 1993, pp. 379-386, vol. 1, California Institute Technology, Pasadena, California USA.

Dilouie, Craig, Introducing the LED Driver, Electrical Construction & Maintenance (EC&M), Sep. 1, 2004, ,pp. 28-32, Zing Communications, Inc., Calgary, Alberda, Canada.

Spiazzi, Giorgio, Simone Buso and Gaudenzio Meneghesso, Analysis of a High-Power-Factor Electronic Ballast for High Brightness Light Emitting Diode, Power Electronics Specialist Conference, 2005. PESC '05, IEEE 36th, pp. 1494-1499, 2005, Dept. Of Information Engineering, University of Padova, Padova, Italy.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Communication Pursuant to Rules 161(1) and 162 EPC issued Aug. 9, 2011 in the corresponding EP Application No. 09764159.1, 2 pages.

Response to the Written Opinion accompanying the International Report on Patentability filed in the corresponding Application No. 09764159.1 on Feb. 20, 2012, 9 pgs.

* cited by examiner

PRIMARY-SIDE BASED CONTROL OF SECONDARY-SIDE CURRENT FOR A TRANSFORMER

CROSS REFERENCE TO RELATED APPLICATIONS

This application is a continuation of application No. 12/415,830, filed Mar. 31, 2009, which claims the benefit of U.S. Provisional Application No. 61/120,455, filed Dec. 7, 2008, both of which are incorporated herein by reference in their entireties.

BACKGROUND OF THE INVENTION

1. Field of the Invention

The present invention relates in general to the field of signal processing, and more specifically to a system and method that includes primary-side based control of secondary-side current for a transformer.

2. Description of the Related Art

Power control systems often utilize a switching power converter to convert alternating current (AC) voltages to direct current (DC) voltages or DC-to-DC. Power control systems often provide power factor corrected and regulated output voltages to many devices that utilize a regulated output voltage. Switching power converters have been used as interfaces between triac-based dimmers and LOADs. The LOAD can be virtually any load that utilizes converted power, such as one or more light emitting diodes (LEDs).

LEDs are becoming particularly attractive as main stream light sources in part because of energy savings through high efficiency light output and environmental incentives, such as the reduction of mercury. LEDs are semiconductor devices and are driven by direct current. The lumen output intensity (i.e. brightness) of the LED approximately varies in direct proportion to the current flowing through the LED. Thus, increasing current supplied to an LED increases the intensity of the LED and decreasing current supplied to the LED dims the LED. Current can be modified by either directly reducing the direct current level to the white LEDs or by reducing the average current through duty cycle modulation.

FIG. 1 depicts a power control system 100, which includes a switching power converter 102. Voltage source 104 supplies an alternating current (AC) input voltage $V_{in}$ to a full bridge diode rectifier 106. Capacitor 107 provides high frequency filtering. The voltage source 104 is, for example, a public utility, and the AC voltage $V_{in}$ is, for example, a 60 Hz/110 V line voltage in the United States of America or a 50 Hz/220 V line voltage in Europe. The rectifier 106 rectifies the input voltage $V_{in}$ and supplies a rectified, time-varying, line input voltage $V_X$ to the switching power converter 102.

The power control system 100 includes a controller 108 to regulate an output voltage $V_L$ of switching power converter 102 and control a primary-side transformer interface 116. Voltage $V_L$ is referred to as a "link voltage". Controller 108 generates a pulse-width modulated control signal $CS_0$ to control conductivity of switch 110 and, thereby, control conversion of input voltage $V_X$ to link voltage $V_L$. Switch 110 is a control switch. The controller 108 controls an ON (i.e. conductive) and OFF (i.e. nonconductive) state of switch 110 by varying a state of pulse width modulated control signal $CS_0$. Switching power converter 102 can be any of a variety of types, such as a boost converter. Controller 108 utilizes feedback signals $V_{X\_FB}$ and $V_{L\_FB}$ to generate switch control signal $CS_0$ to regulate the link voltage $V_L$. Feedback signal $V_{X\_FB}$ represents input voltage $V_X$, feedback signal $V_{L\_FB}$ represents link voltage $V_L$.

Power control system 100 includes an isolation transformer 112 to isolate the primary-side 122 and secondary-side 124 of power control system 100. Depending upon the type of switching power converter 102, the link voltage $V_L$ is either a multiple or a fraction of the input voltage $V_X$. For a boost type switching power converter 102, the link voltage $V_L$ can be several hundred volts. Often the LOAD 114 does not require such high voltages. Transformer 112 steps down the link voltage $V_L$ to a lower secondary voltage $V_S$. A lower secondary voltage $V_S$ can have several advantages. For example, lower voltages are generally safer. Additionally, LOAD 114 ay have a metal heat sink, such as a heat sink to dissipate heat from one or more LEDs. The cost of insulation requirements implemented by regulatory associations for LOAD 114 generally decreases as the secondary voltage $V_S$ decreases below various voltage thresholds. Therefore, a lower voltage across LOAD 114 can lower manufacturing costs.

The power control system 100 includes a primary-side transformer interface 116 between the switching power converter 102 and the primary-side of transformer 112. Since link voltage $V_L$ is a regulated, generally constant voltage over a period of time, the primary-side transformer interface 116 converts the link voltage $V_L$ into a time-varying voltage $V_P$. The transformer 112 induces the secondary-side voltage $V_S$ from the primary voltage $V_P$. A variety of topologies for interfaces 116 exist, such as half-bridge, full-bridge, and push-pull interfaces. The primary-side interface 116 includes one or more switches (not shown) arranged in accordance with the topology of interface 116. The controller 108 generates pulse width modulated switch control signals $\{CS_1 \ldots CS_M\}$ to control the respective conductivity of switches (not shown) in interface 116. The set of switch control signals $\{CS_1 \ldots CS_M\}$ allows the interface 116 to convert the link voltage $V_L$ into the primary-side voltage $V_P$, which can be passed by transformer 112. Thus, the control signals $\{CS_1 \ldots CS_M\}$ control the coupling of the primary-side voltage $V_P$ to the secondary-side 124. Exemplary primary-side transformer interfaces 116 are discussed in chapter 6 of *Fundamentals of Power Electronics—Second Edition* by Erickson and Maksimović, publisher Springer Science+Business Media, LLC, copyright 2001 ("*Fundamentals of Power Electronics*"). The power control system 100 also includes a secondary-side transformer interface 118 between the secondary-side of transformer 112 and LOAD 114 to convert the secondary voltage $V_S$ into an output voltage $V_{OUT}$. A variety of interfaces 118 exist, such as half-bridge buck converter and full-bridge buck converters. Exemplary secondary-side transformer interfaces 118 are also discussed in chapter 6 of *Fundamentals of Power Electronics*.

For a load 114 that utilizes a regulated secondary-side current $i_{LOAD}(t)$, controller 108 regulates the link voltage $V_L$ and the primary-side voltage $V_P$ to establish a particular value for secondary-side load current $i_{LOAD}(t)$. The secondary-side current $i_{LOAD}(t)$ is a function of an integral of the primary-side voltage $V_P$ over time. Controller 108 regulates the primary-side voltage $V_P$ by controlling the duty cycles of control signals $\{CS_1 \ldots CS_M\}$. If the value of secondary side current $i_{LOAD}(t)$ is too large, controller 108 decreases the duty cycle of control signals $\{CS_1 \ldots CS_M\}$, and, if the value of secondary side current $i_{LOAD}(t)$ is too small, controller 108 increases the duty cycle D of control signals $\{CS_1 \ldots CS_M\}$. For a transformer with $N_P$ primary-side windings and $N_S$ secondary-side windings, the primary-side voltage $V_P$ and the secondary side voltage $V_S$ are related to each other in accordance with Equation [1], where $N_P$ and $N_S$ represent the respective number of primary-side and secondary-side windings:

$$V_P \cdot N_S = V_S \cdot N_P \quad [1]$$

For an ideal transformer, the primary-side current $i_P(t)$ and the secondary-side windings current $i_S(t)$ are related in accordance with Equation [2]:

$$i_P(t) \cdot N_P - i_S(t) \cdot N_S = 0 \quad [2]$$

The secondary-side windings current $i_S(t)$ is one example of a secondary-side current. The secondary-side windings current $i_S(t)$ is the current in the secondary windings of transformer 112. The secondary-side load current $i_{LOAD}(t)$ also represents a secondary-side current. The secondary-side load current $i_{LOAD}(t)$ is a function of the secondary-side windings current $i_S(t)$ as modified by the secondary-side transformer interface 118.

For a real transformer 112, the primary-side current $i_P(t)$ has a magnetizing current component, $i_M(t)$. Equation [3] depicts a relationship between the primary-side current $i_P(t)$ and the magnetizing current component $i_M(t)$:

$$i_P(t) = i_P'(t) + i_M(t) \quad [3]$$

The current $i_P'(t)$ is related to the secondary-side windings current $i_S(t)$ in accordance with Equation [4]:

$$i_P'(t) = i_S(t) \cdot N_S / N_P \quad [4]$$

Thus, the primary-side current $i_P(t)$ is related to the secondary-side windings current $i_S(t)$ in accordance with Equation [5]:

$$i_P(t) = i_S(t) \cdot N_S / N_P + i_M(t) \quad [5]$$

In at least one embodiment, the magnetizing current on the primary-side of transformer 112 is not directly measurable. Accordingly, it is very difficult to monitor changes in the secondary-side load current $i_{LOAD}(t)$ without actually sampling the secondary-side current $i_{LOAD}(t)$.

To regulate the secondary-side load current $i_{LOAD}(t)$, controller 108 utilizes feedback signal $i_{LOAD}(t)\_FB$ to generate switch control signals $CS_1 \ldots CS_M$. Feedback signal $i_{LOAD}(t)\_FB$ represents the secondary-side load current $i_{LOAD}(t)$. Power control system 100 includes coupler 120 to receive feedback signal $i_{LOAD}(t)\_FB$. The feedback signal $i_{LOAD}(t)\_FB$ is, for example, a current or voltage that represents the value of secondary-side current $i_{LOAD}(t)$. Coupler 120 is, for example, an optical coupler that maintains isolation between the primary-side 122 and secondary-side 124 of power control system 100. In another embodiment, coupler 120 is a resistor. When using a resistor, insulation of LOAD 114 and other components can be used to address safety concerns. In any event, the coupler 120 and any auxiliary materials, such as insulation, add cost to power control system 100.

Some conventional electronic systems, such as electronic system 100, limit the secondary-side load current $i_{LOAD}(t)$ to protect load 114. To simply limit secondary-side load current $i_{LOAD}(t)$, controller 108 can limit secondary-side load current $i_{LOAD}(t)$ by observing the primary-side current $i_P(t)$ without receiving feedback signal $i_{LOAD}(t)\_FB$. The controller 108 can compare a peak target value of primary-side current $i_P(t)$ and the observed primary-side current $i_P(t)$, and limit the primary-side current $i_P(t)$ to the peak target value. Limiting the primary-side current $i_P(t)$ limits the secondary side load current $i_{LOAD}(t)$. However, because of many variables, such as the magnetizing current $i_M(t)$ and variations in the duty cycles of switch control signal $CS_1 \ldots CS_M$ due to ripple in the input voltage $V_X$ and link voltage $V_L$, limiting the secondary-side load current $i_{LOAD}(t)$ based on a peak target value of primary-side current $i_P(t)$ results in controlling the secondary-side load current with, for example, a 15-50% margin of error. Thus, limiting the secondary-side current $i_{LOAD}(t)$ does not regulate the secondary-side current $i_{LOAD}(t)$.

In one embodiment of the present invention, an apparatus includes a controller to regulate a load current to a load coupled to a secondary-side of a transformer to an approximately average value based on an observed primary-side signal value. The controller is configured to generate one or more duty cycle modulated switch control signals to control a voltage on a primary-side of the transformer based on the primary-side signal value. The load current represents a current into the load and out of a filter. The filter is coupled to a rectifier, and the rectifier is coupled to the secondary-side of the transformer.

In another embodiment of the present invention, a method includes regulating a load current to a load coupled to a secondary-side of a transformer to an approximately average value based on an observed primary-side signal value. Regulating the output current includes generating one or more duty cycle modulated switch control signals to control a voltage on a primary-side of the transformer based on the primary-side signal value. The load current represents a current into the load and out of a filter. The filter is coupled to a rectifier, and the rectifier is coupled to the secondary-side of the transformer.

In a further embodiment of the present invention, an electronic system includes a controller. The controller is configured to receive a feedback signal from a primary-side of a transformer, wherein the feedback signal represents a current in the primary-side of the transformer. The controller is further configured to generate control signals for circuitry coupled to the primary-side of the transformer to regulate a load current on a secondary-side of the transformer to an approximately average value based on the feedback signal from the primary-side of the transformer without using a feedback signal from a secondary-side of the transformer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
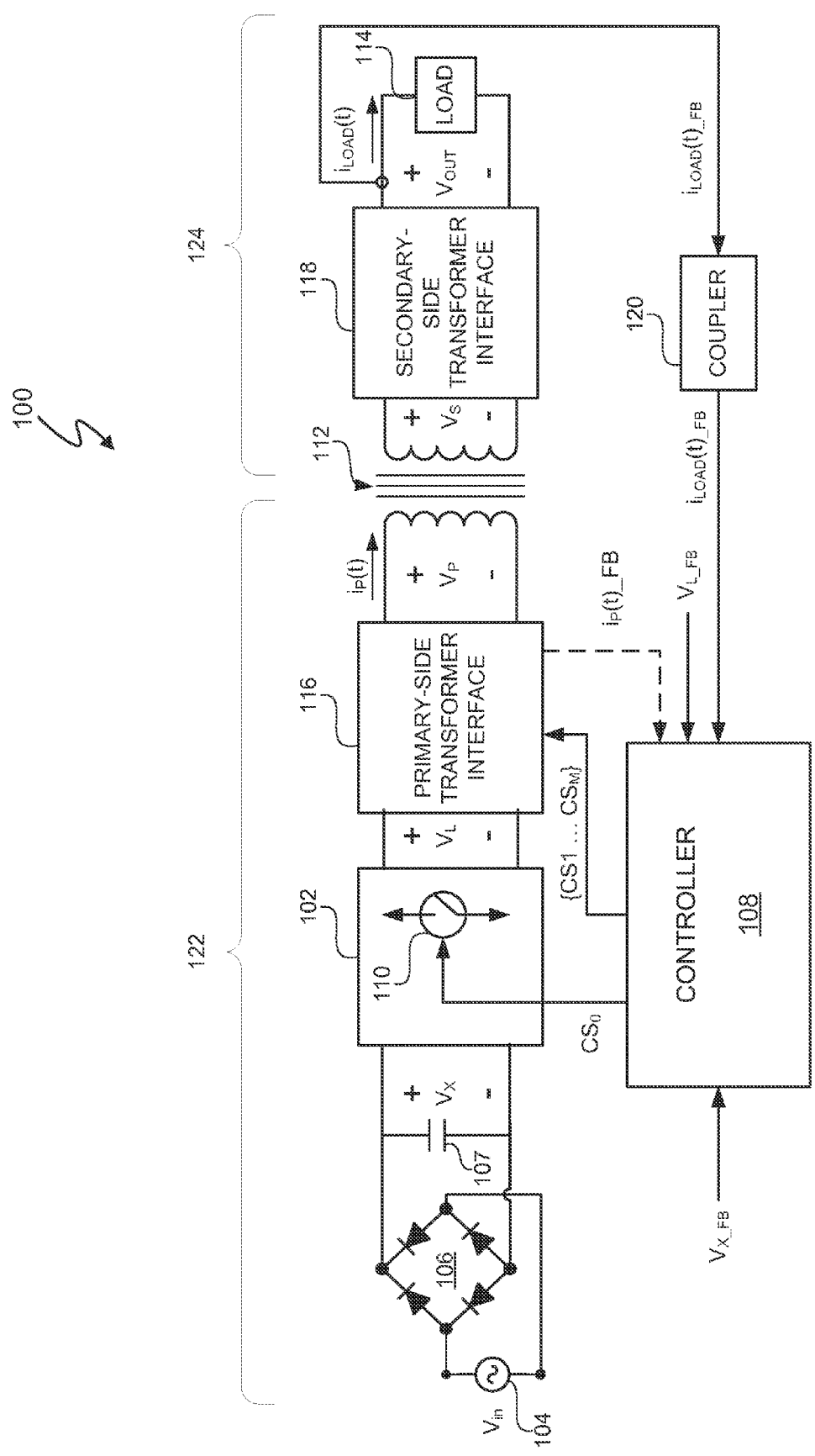
FIG. 1 (labeled prior art) depicts a power control system with transformer isolation and secondary-side current feedback.

In at least one embodiment, a power control system includes a transformer, such as an isolation transformer, and a controller regulates a current on a secondary-side of the transformer based on an observed primary-side signal value. In at least one embodiment, the controller is configured to generate one or more duty cycle modulated switch control signals to control a voltage on a primary-side of the transformer based on the observed primary-side signal value and the secondary-side current represents a load current into a load and out of a filter coupled to a rectifier coupled to the secondary-side of the transformer. In at least one embodiment, the load includes one or more LEDs. In at least one embodiment, the primary-side signal value is a sample of a current in the primary-side windings of the transformer. "Regulation" of a particular signal means that the signal can be controlled with less than a 10% error. In at least one embodiment, the controller regulates the load current within 10% of a target value. In at least one embodiment, the controller regulates the load current within 5% of the target value. It is possible to regulate within closer limits, such as within 1%, 2%, 3%, or 4%. Generally closer regulation requires more expensive components. Unlike peak current limiting, in at least one embodiment, there is no theoretical limit to the regulation that can be achieved by the power control system described herein.

In at least one embodiment, the primary-side signal value represents an observed value, such as a sampled value, of a primary-side transformer current. In at least one embodiment, proper timing of the sampling of the primary-side signal value substantially eliminates contributions of a transformer magnetizing current from the primary-side transformer current sample. Sampling the primary-side signal value when contributions of the transformer magnetizing current are substantially eliminated allows at least an average of the secondary-side current to be determined from the primary-side signal value. "Substantially eliminated" means completely eliminated or reduced to a point where the influence of the magnetizing current does not prevent regulation of the secondary-side current based on the primary-side signal value. In at least one embodiment, the primary-side transformer current is sampled at a midpoint of a pulse of at least one of the switch control signals. In at least one embodiment, the midpoint of the pulse coincides with an average value of the secondary-side current and coincides with a zero value magnetizing current. With a zero value magnetizing current, the primary-side transformer current and the secondary-side current are directly related by the turns ratio of the isolation transformer. Because the turns ratio is an easily obtainable, fixed number, in at least one embodiment, the controller can accurately control the secondary-side current based on the primary-side signal value, such as the primary-side transformer current sample, without using a value of an input voltage at the primary-side or inductance values on the primary and secondary sides of the transformer and without a secondary-side current feedback signal.

In at least one embodiment, basing control of the secondary-side current on a primary-side signal value without using a secondary-side feedback signal reduces costs and increase operational efficiency of the electronic system utilizing the controller. In another embodiment, an average of the primary-side transformer current during one or more pulses of at least one of the switch control signals corresponds to an average value of the secondary-side transformer current. In another embodiment, an average of the primary-side transformer current during one or more periods of at least one of the switch control signals corresponds to an average value of the secondary-side transformer current.

The controller is configured to generate the one or more switch control signals based on the primary-side signal value. In at least one embodiment, the controller utilizes the primary-side signal value to generate one or more switch control signals to control a voltage on a primary-side of the transformer. In at least one embodiment, the voltage controlled is a voltage across primary-side windings of the transformer. In at least one embodiment, the controller regulates an output current on a secondary-side of the transformer to an approximately average value. Regulation of the output current can be accomplished in any number of ways. For example, in at least one embodiment, the controller regulates the output current on the secondary-side of the transformer by adjusting a duty cycle of at least one of the one or more switch control signals.

Figure 2:
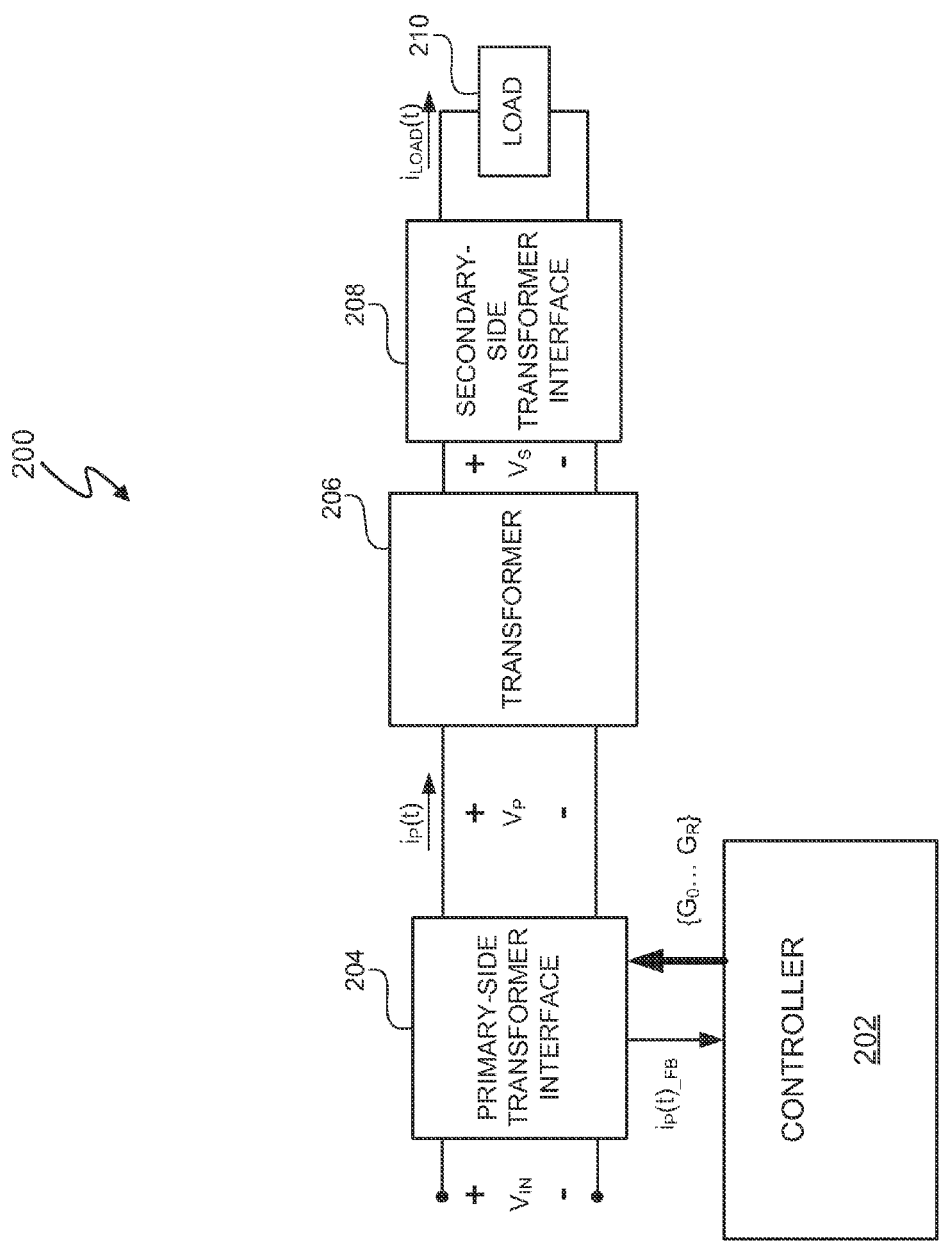
FIG. 2 depicts a power control system that includes a controller to set a value of a secondary-side current based on primary-side signal value.

FIG. 2 depicts a power control system 200 that includes a controller 202 to regulate an approximately average value of an exemplary secondary-side current, such as secondary-side load current $i_{LOAD}(t)$, based on a primary-side signal value, such as primary-side current feedback signal $i_P(t)\_{FB}$. The term "approximately average" indicates the value is either the average value or differs from the average value by an amount resulting from precision limitations in circuitry used to observe and/or determine the primary-side signal value. In at least one embodiment, "observing" includes any form of monitoring, sampling, inspecting, obtaining, or detecting or any combination thereof. Controller 202 generates switch control signals $G_0 \ldots G_R$ to modulate the primary-side transformer voltage $V_P$. In at least one embodiment, the switch control signals $G_0 \ldots G_R$ are duty cycle modulated switch control signals, such as pulse width modulated switch control signals.

In at least one embodiment, proper timing of the sampling of the primary-side feedback signal $i_P(t)\_{FB}$ eliminates contributions of a transformer magnetizing current from the primary-side transformer current. For example, by sampling the primary-side feedback signal $i_P(t)\_{FB}$ at a midpoint of pulses of at least one of the control signals $G_0 \ldots G_R$, the primary-side current $i_P(t)$ is directly related to the secondary-side winding current $i_S(t)$ by the turns ratio $N_S/N_P$, i.e. $i_P(t) \cdot N_S/N_P = i_S(t)$. The relationship between the secondary-side current $i_S(t)$ and the load current $i_{LOAD}(t)$ is also a known function of the transfer function of the secondary-side transformer interface 208. The particular transfer function is a function of the components in the secondary-side transformer interface 208.

The input voltage $V_{IN}$ is supplied to the primary-side transformer interface 204, and primary-side transformer interface 204 converts the input voltage $V_{IN}$ into a time-varying primary-side voltage $V_P$. The source of the input voltage $V_{IN}$ can be any source. In at least one embodiment, the input voltage $V_{IN}$ is a regulated output voltage of a switching power converter (not shown).

The transformer 206 induces the secondary-side voltage $V_S$ from the primary-side voltage $V_P$. Transformer 206 includes $N_P$ primary winding turns and $N_S$ secondary winding turns, where $N_P$ and $N_S$ respectively represent the number of primary and secondary winding turns. The primary-side voltage $V_P$ and secondary-side voltage $V_S$ are related to each in accordance with Equation [1]. The secondary-side transformer interface 208 generates an output voltage, which causes the secondary-side current $i_{LOAD}(t)$ to flow into load 210. In at least one embodiment, load 210 includes one or more LEDs.

The midpoint of the pulses of control signals $G_0 \ldots G_R$ coincides with an average value of the secondary-side load current $i_{LOAD}(t)$ and also coincides with a zero value magnetizing current of transformer 206. With a zero value magnetizing current, the primary-side transformer current and the secondary-side current are directly related by the turns ratio of the isolation transformer. Because the turns ratio is an easily obtainable, fixed number, in at least one embodiment, the controller can accurately control the secondary-side currents $i_S(t)$ and $i_{LOAD}(t)$ based on the primary-side signal value, such as the primary-side transformer feedback signal $i_P(t)\_{FB}$, without using a value of input voltage $V_{IN}$ or inductance values on the primary and secondary sides of transformer 206 and without a secondary-side current feedback signal. In at least one embodiment, controller 202 compensates for circuit non-idealities of, for example, the primary-side primary transformer interface to sample the primary-side transformer feedback signal $i_P(t)\_{FB}$. For example, system delays, such as delays caused by parasitic capacitances, can cause delays between the correlation of the midpoint of switch control signals $G_0 \ldots G_R$ and the sample of the primary-side transformer feedback signal $i_P(t)\_{FB}$. Thus, in at least one embodiment, to increase the accuracy of the regulation of the secondary-side current, controller 202 compensates for the system delays.

In another embodiment, an average of the primary-side current $i_P(t)$ during one or more pulses of at least one of the switch control signals $G_0 \ldots G_R$ corresponds to an average value of the secondary-side load current $i_{LOAD}(t)$. In another embodiment, an average of the primary-side transformer feedback signal $i_P(t)$ during one or more periods of at least one of the switch control signals $G_0 \ldots G_R$ corresponds to an average value of the secondary-side transformer load current $i_{LOAD}(t)$.

In at least one embodiment, the controller 202 generates switch control signals $G_0 \ldots G_R$ to modulate the primary-side transformer voltage $V_P$, where R+1 represents the number of switch control signals and R is greater than or equal to zero. Changing the duty cycle of the primary-side transformer voltage $V_P$ changes the secondary-side voltage $V_S$ and, thus, changes the secondary-side current $i_{LOAD}(t)$. The particular value of R is a matter of design choice and depends, for example, on the type of primary-side transformer interface 204. Primary-side transformer interface 204 can be any type of interface such as a push-pull, full bridge, or half-bridge interface. Secondary-side transformer interface 208 can also be any type of interface such as a half-bridge/buck converter. The particular type of transformer interfaces is a matter of design choice and depends, for example, on the type of load 210 and desired characteristics of, for example, secondary-side current $i_{LOAD}(t)$. Load 210 can be any type of load including one or more LEDs arranged in one or more serial or parallel strings.

Figure 3:
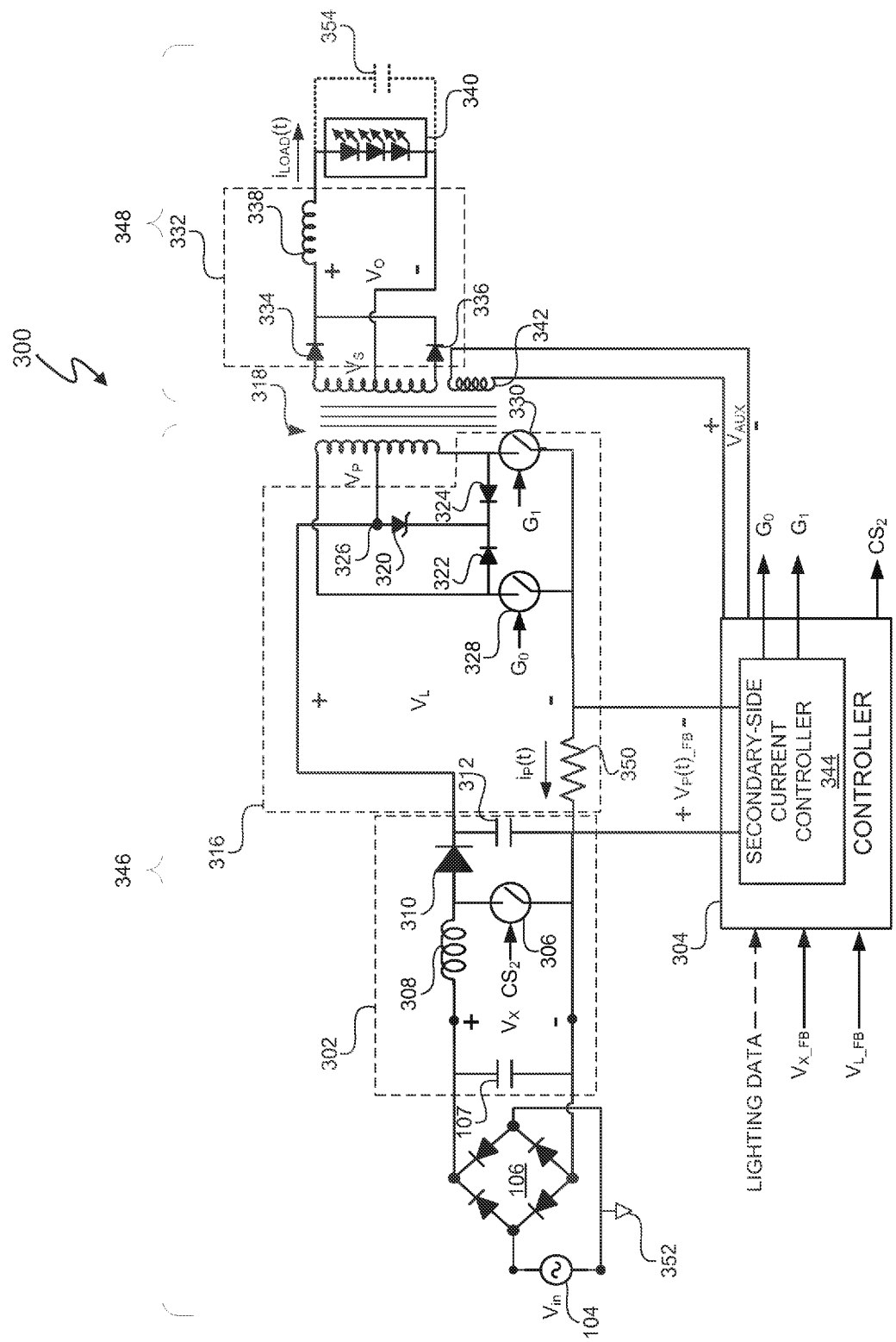
FIG. 3 depicts an embodiment of the power control system of FIG. 2 and a boost-type switching power converter.

FIG. 3 depicts power control system 300. Power control system 300 represents one embodiment of power control system 200 and also includes a boost-type switching power converter 302. In at least one embodiment, controller 304 generates switch control signal $CS_2$ to control switch 306 to regulate the link voltage $V_L$ and to provide power factor correction. U.S. patent application Ser. No. 11/967269, entitled "POWER CONTROL SYSTEM USING A NON-LINEAR DELTA-SIGMA MODULATOR WITH NONLINEAR POWER CONVERSION PROCESS MODELING", filed Dec. 31, 2007, inventor John L. Melanson, and assignee Cirrus Logic, Inc. (referred to herein as "Melanson I") describes exemplary control of switching power converter 302. In general, switch control signal $CS_2$ causes switch 306 to conduct, and the voltage across inductor 308 increases. When switch control signal $CS_2$ controls switch 306 to stop conducting, current flows through diode 310 and charges capacitor 312 towards a sum of the input voltage $V_X$ and the voltage across inductor 308. The voltage across capacitor 312 is the link voltage $V_L$. Capacitor 312 is sized so as to maintain an approximately constant link voltage $V_L$. In at least one embodiment, switch control signal $CS_2$ is also modulated to provide power factor correction. The link voltage $V_L$ can be any voltage that is sufficient to drive load 340. In at least one embodiment, link voltage $V_L$ is approximately 200 V. In at least one embodiment, controller 304 utilizes feedback signals $V_{X\_FB}$ and $V_{L\_FB}$ to generate switch control signal $CS_2$. Feedback signal $V_{X\_FB}$ represents input voltage $V_X$, feedback signal $V_{L\_FB}$ represents link voltage $V_L$.

A push-pull circuit 316 represents one embodiment of primary-side transformer interface 204. Push-pull circuit 316 generates a primary-side transformer voltage to induce a secondary-side voltage in the secondary-side windings of transformer 318. Transformer 318 is an isolation transformer that provides isolation between the primary-side 346 and secondary-side 348. Push-pull circuit includes Zener diode 320 and diodes 322 and 324 configured as a snubber circuit to provide stability at voltage node 326. Push-pull circuit 316 also includes switches 328 and 330 having conductivity that is respectively controlled by switch control signals $G_0$ and $G_1$. As subsequently explained in more detail, switch control signals $G_0$ and $G_1$ control the secondary-side current $i_{LOAD}(t)$. Transistors 328 and 330 represent one type of switch. The type of switches 328 and 330 is a matter of design choice. In at least one embodiment, switches 328 and 330 are n-channel field effect transistors.

Secondary-side transformer interface 332 includes diodes 334 and 336 plus inductor 338 arranged in a half-bridge, buck converter configuration. Inductor 338 represents one embodiment of a filter at the output of the rectifier 334. Any filter can be utilized. For example, in at least one embodiment, the filter also includes an optional capacitor 354 (shown in dotted lines) to form an LC filter. Secondary-side transformer interface 332 represents one embodiment of secondary-side transformer interface 208. Load 340 includes three LEDs. Power control system 300 also includes optional auxiliary secondary windings 342 to provide auxiliary power to controller 304.

Figure 4:
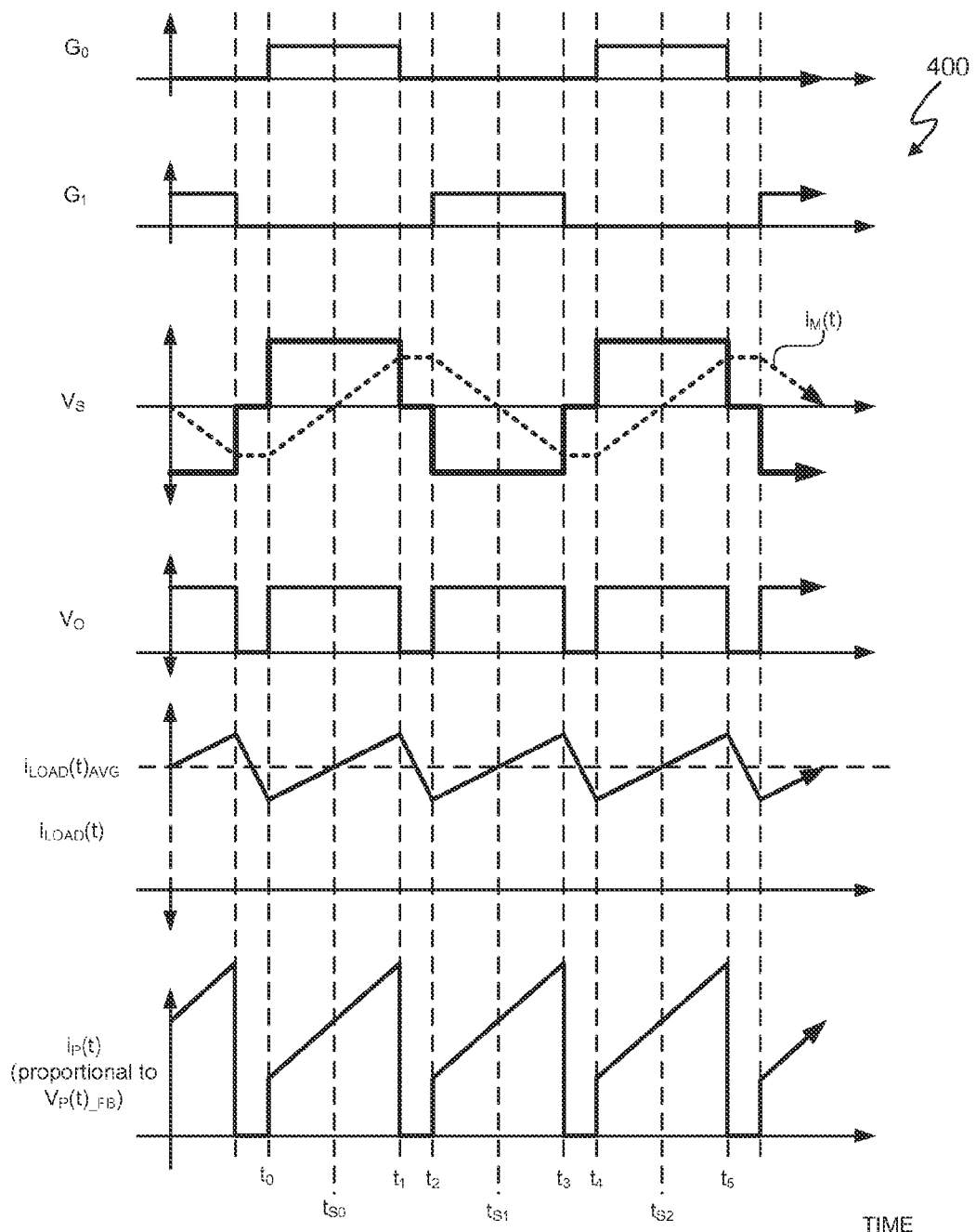
FIG. 4 depicts exemplary power control system signals occurring during operation of the power control system of FIG. 3.
Figure 5:
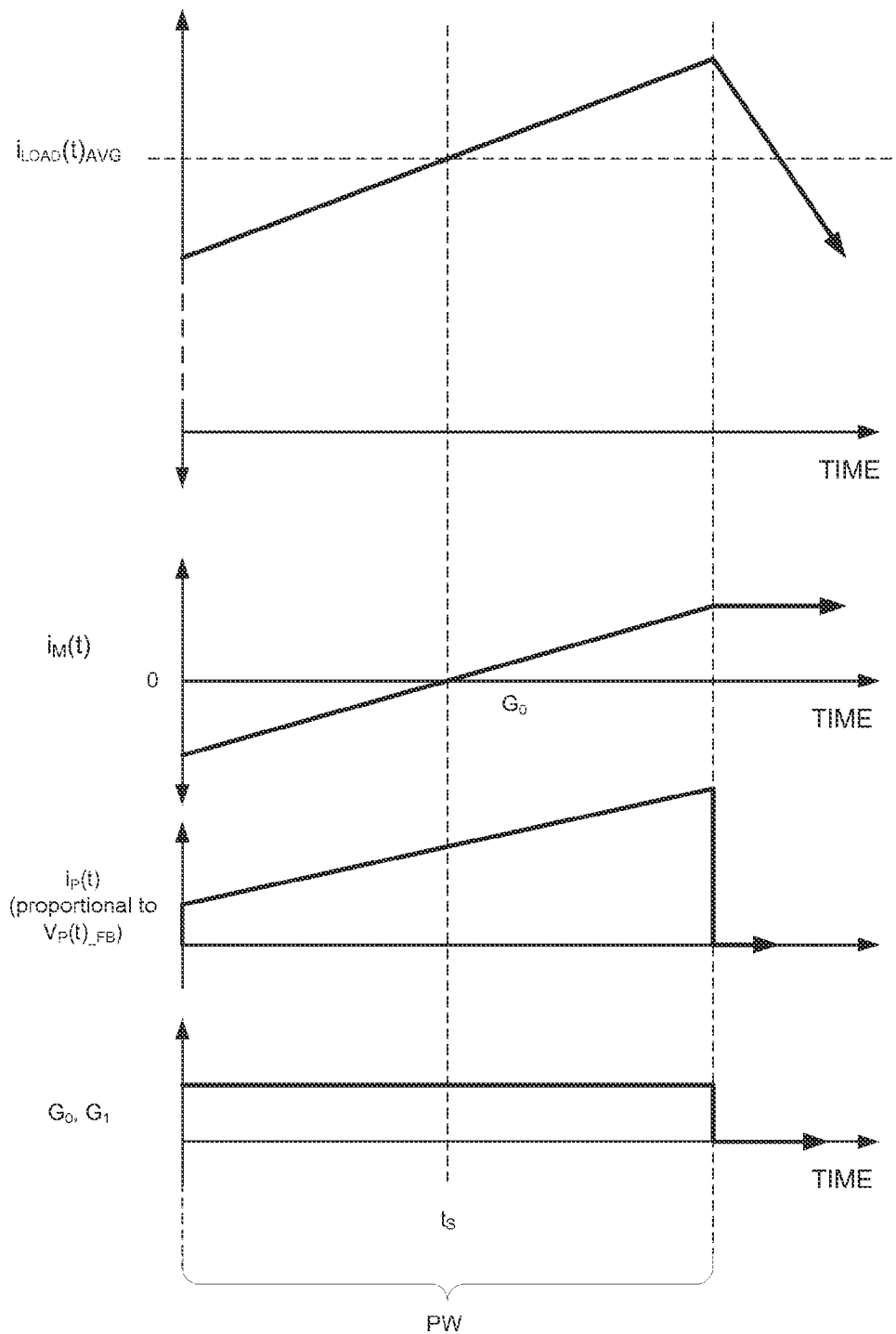
FIG. 5 depicts relationships between an average secondary-side current, a magnetizing current, switch control signals, and a primary-side current during one pulse of the switch control signals.

FIG. 4 depicts power control system signals 400, which represent exemplary signals occurring during operation of power control system 300. FIG. 5 depicts the relationships between the average secondary-side current $i_{LOAD}(t)_{AVG}$, the magnetizing current $i_M(t)$, the switch control signals $G_0$ and $G_1$, and the primary-side current $i_P(t)$ during one pulse of switch control signals $G_0$ and $G_1$. Referring to FIGS. 3, 4, and 5, controller 304 includes a secondary-side current controller 344 to control the primary-side voltage $V_P$. The secondary-side current controller 344 generates duty cycle modulated switch control signals $G_0$ and $G_1$ based on a primary-side signal value, which in one embodiment is feedback voltage $V_P(t)\_{FB}$. Sense resistor 350 is connected between switches 328 and 330 and a voltage reference 352, such as a ground reference voltage. The primary current $i_P(t)$ develops the feedback voltage $V_P(t)\_{FB}$ across sense resistor 350. The resistance value of sense resistor 350 is a matter of design choice. In at least one embodiment, the value of sense resistor 350 is designed to provide a voltage drop, such as a few tenths of a volt, that is sufficiently large to be observed by secondary-side current controller 344. Because of $i^2R$ losses across sense resistor 504 and a primary-side voltage being higher than secondary-side voltage $V_S$, locating sense resistor 350 on the primary-side 346 is more efficient due to, for example, lower thermal losses, relative to locating sense resistor 350 on the secondary-side 348. Additionally, in at least one embodiment, locating sense resistor 350 on the primary-side 350 eliminates primary-to-secondary-side feedback coupling and/or extra insulation for load 340, thus, reducing component costs.

The secondary-side current controller 344 alternates pulses of switch control signals $G_0$ and $G_1$ so that the primary voltage $V_P$ and secondary voltage $V_S$ cycles between positive and negative values. FIG. 4 depicts the secondary voltage $V_S$. The primary voltage $V_P$, not shown in FIG. 4, is a scaled version of the secondary voltage $V_S$ in accordance with Equation [1]. The number of primary windings $N_P$ and the number of secondary windings $N_S$ is a matter of design choice and depends on the value of the link voltage $V_L$ and the desired maximum secondary-side voltage $V_S$.

During a pulse of switch control signal $G_0$, such as between times $t_0$ and $t_1$, switch 328 conducts and causes secondary-side voltage $V_S$ to pulse positive. The magnetizing current $i_M(t)$ is related to the integral of the secondary-side voltage $V_S$. So, when the secondary-side voltage $V_S$ pulses positive, the magnetizing current $i_M(t)$ ramps up. From times $t_1$ to $t_2$, secondary-side current controller 344 drives both switch control signals $G_0$ and $G_1$ low and the secondary-side voltage $V_S$ drops to zero. When the secondary-side voltage $V_S$ is zero, the magnetizing current $i_M(t)$ remains essentially unchanged. From times $t_2$ to $t_3$, switch control signal $G_0$ is low, and switch control signal $G_1$ pulses high causing the secondary voltage $V_S$ to drop to a negative value. When the secondary voltage $V_S$ drops to the negative value, the magnetizing current $i_M(t)$ ramps down. The average value of the secondary voltage $V_S$ is zero, so at the midpoint of each pulse of secondary voltage $V_S$, e.g. at times $t_{S0}$, $t_{S1}$, and $t_{S2}$, the value of the magnetizing current $i_M(t)$ is also zero. In at least one embodiment, controller 304 compensates for system delays due to, for example, parasitic capacitances in primary-side transformer interface 316 when sampling the feedback voltage $V_P(t)\_{FB}$ by sampling the feedback voltage $V_P(t)\_{FB}$ at the midpoint times $t_{S0}$, $t_{S1}$, and $t_{S2}$ plus the system delay. Thus, the sampled feedback voltage $V_P(t)\_{FB}$ corresponds to the midpoint times when the magnetizing current $i_M(t)$ is zero. The midpoint of each pulse of secondary voltage $V_S$ corresponds with the midpoint of each pulse of switch control signals $G_0$ and $G_1$. Since secondary-side current controller 344 controls the timing of switch control signals $G_0$ and $G_1$, the midpoint times $t_{S0}$, $t_{S1}$, and $t_{S2}$ and, thus, the times at which the magnetizing current $i_M(t)$ is zero is known by secondary-side controller 344. In at least one embodiment, the secondary-side controller 344 includes a memory or can access a memory that stores the values of $N_S$, $N_P$, and the value $R_S$ of sense resistor 350 and includes a processor, either analog, digital, or mixed analog and digital.

The half-bridge configuration of diodes 334 and 336 rectifies the secondary-side voltage $V_S$ to generate a square wave output voltage $V_O$ between diode 334 and inductor 338. The secondary-side current $i_{LOAD}(t)$ is a function of an integral of output voltage $V_O$, so the secondary-side current ramps up when output voltage $V_O$ pulses high, such as between times $t_0$ and $t_1$, and ramps down when output voltage $V_O$ drops to zero, such as between times $t_1$ and $t_2$. The midpoints of the secondary-side current $i_{LOAD}(t)$ occur at the midpoint times, e.g. $t_{S0}$, $t_{S1}$, and $t_{S2}$, of switch control signals $G_0$ and $G_1$ when the magnetizing current $i_M(t)$ is zero. The midpoints of the secondary-side current $i_{LOAD}(t)$ represent an average value $i_P(t)_{AVG}$ of secondary-side current $i_{LOAD}(t)$.

In at least one embodiment, the primary-side current $i_P(t)$ is related to the secondary-side windings current $i_S(t)$ in accordance with Equation [5]. In at least one embodiment, the secondary-side current controller 344 observes the primary-side current $i_P(t)$ via the primary-side signal value voltage $V_P(t)\_{FB}$ at the midpoint times of switch control signals $G_0$ and $G_1$ (and, thus, at the midpoint times of secondary-side current $i_{LOAD}(t)$). In at least one embodiment, the magnetizing current $i_M(t)$ is not directly measurable. However, since the magnetizing current $i_M(t)$ is zero at the midpoint times, e.g. $t_{S0}$, $t_{S1}$, and $t_{S2}$, Equation [5] becomes Equation [6] at the midpoint times, e.g. $t_{S0}$, $t_{S1}$, and $t_{S2}$:

$$i_P(t)=i_S(t)N_S/N_P \qquad [6], \text{ and}$$

$$i_P(t)=i_{LOAD}(t)_{AVG}N_S/N_P \qquad [7].$$

Equation [7] is true at the midpoint times, e.g. $t_{S0}$, $t_{S1}$, and $t_{S2}$. The value of the primary-side current $i_P(t)$, and, thus, the average value of the secondary-side current $i_{LOAD}(t)$, is determined by the duty cycle of the switch control signals $G_0$ and $G_1$. Increasing the duty cycle of switch control signals $G_0$ and $G_1$ increases the value of primary-side current $i_P(t)$, and, thus, increases the average value of secondary-side current value $i_{LOAD}(t)_{AVG}$. Decreasing the duty cycle of switch control signals $G_0$ and $G_1$ decreases the value of primary-side current $i_P(t)$, and, thus, decreases the average value of secondary-side current value $i_{LOAD}(t)_{AVG}$. Thus, the secondary-side current controller 344 controls the average secondary-side current value $i_{LOAD}(t)$. Because the average secondary-side current $i_{LOAD}(t)_{AVG}$ is directly related to the primary-side current $i_P(t)$ at the known midpoint times of switch control signals $G_0$ and $G_1$, e.g. $t_{S0}$, $t_{S1}$, and $t_{S2}$, the secondary-side current controller 344 can set a value of the secondary-side current $i_{LOAD}(t)$ based on the exemplary primary-side signal value $V_P(t)\_{FB}$, which is directly proportional to the primary-side current $i_P(t)$, i.e. $V_P(t)\_{FB}$ α $i_P(t)$, where "α" is a proportionality indicator. In at least one embodiment, $V_P(t)\_{FB}=i_P(t)/R_S$, where $R_S$ is the resistance value of sense resistor 350. In at least one embodiment, the secondary-side current controller 344 sets the average value $i_{LOAD}(t)_{AVG}$ of secondary-side current $i_{LOAD}(t)$ when the magnetizing current $i_M(t)$ is at a predetermined value, e.g. at $i_M(t)=0$.

The average value $i_{LOAD}(t)_{AVG}$ of secondary-side current $i_{LOAD}(t)$ can be determined in any number of other ways also. For example, in at least one embodiment, the average value of the primary-side current $i_P(t)$ during each pulse of switch control signals $G_0$ and $G_1$ or over a number of pulses also corresponds to the average value of the secondary-side current value $i_{LOAD}(t)_{AVG}$. For example, the primary-side current $i_P(t)$ is zero when switch control signals $G_0$ and $G_1$ cause switches 328 and 330 to turn OFF, e.g. for an n-channel FET embodiments of switches 328 and 330, the primary-side current $i_P(t)$ is zero when switch control signals $G_0$ and $G_1$ are low. Thus, an average value $i_P(t)\_{AVG}$ of the primary-side current $i_P(t)$ over a period of switch control signals $G_0$ and $G_1$ or when switch control signals $G_0$ and $G_1$ cause switches 328 and 330 to conduct also equals $_{LOAD}(_t)_{AVG}$ in accordance with Equation [8]:

$$i_P(t)\_{AVG}=i_{LOAD}(t)_{AVG}N_S/N_P \qquad [8].$$

Thus at least one embodiment, secondary-side current controller 344 determines an average value of the secondary-side current value $i_{LOAD}(t)_{AVG}$ by determining the average value of the primary-side current $i_P(t)$ during each pulse of switch control signals $G_0$ and $G_1$ or over a number of pulses and multiplying the value by the turns ratio $N_S/N_P$.

In at least one embodiment, the average value of the primary-side current $i_P(t)$ during each period of switch control signals $G_0$ and $G_1$ or over a number of periods also corresponds to the average value of the secondary-side current value $i_{LOAD}(t)_{AVG}$. Thus, in at least one embodiment, secondary-side current controller 344 determines an average value of the secondary-side current value $i_{LOAD}(t)_{AVG}$ by determining the average value of the primary-side current $i_P(t)$ during each period of switch control signals $G_0$ and $G_1$ or over a number of periods M (such as two consecutive samples of primary-side current $i_P(t)$) and multiplying the value by the turns ratio $N_S/N_P$ divided by (D·M). M is a number that represents the number of periods and D represents the duty cycle of switch control signals $G_0$ and $G_1$. In at least one embodiment, averaging two consecutive samples of the primary-side current $i_P(t)$ cancels any offset in the magnetizing current $i_M(t)$.

Figure 6:
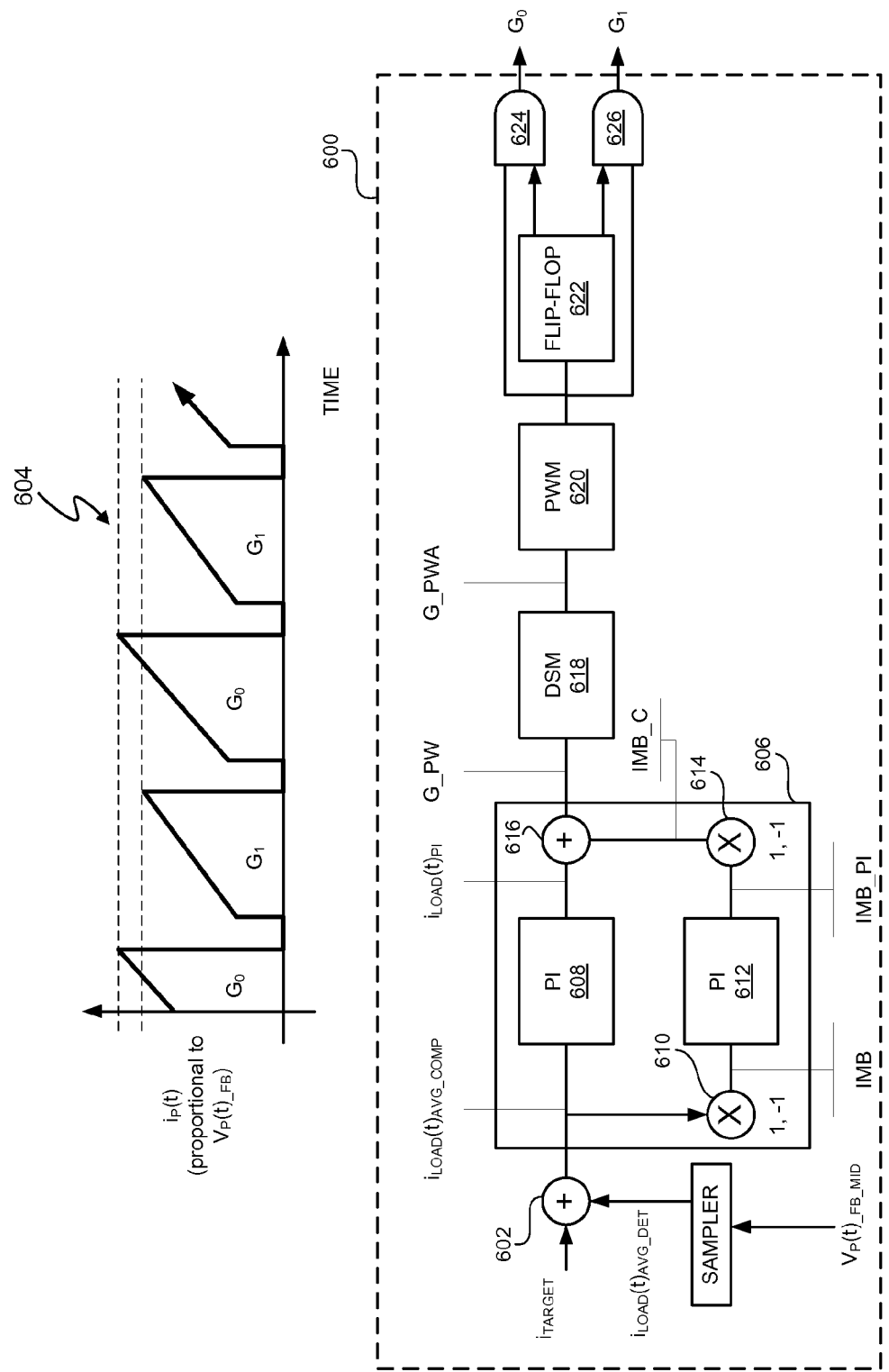
FIG. 6 depicts a secondary-side current controller.

FIG. 6 depicts secondary-side current controller 600 having components generate the switch control signals $G_0$ and $G_1$ to set a secondary-side current average value $I_{LOAD}(t)_{AVG}$ and to compensate for imbalances in primary-side transformer interface 316. Secondary-side current controller 600 represents one embodiment of secondary-side controller 344 (FIG. 3). Summer 602 adds a target value $i_{TARGET}$ to a determined value $i_{LOAD}(t)_{AVG\_DET}$ of the actual secondary-side current value $i_{LOAD}(t)$ to generate a comparison signal $i_{LOAD}(t)_{AVG\_COMP}$. In at least one embodiment, the value of $i_{LOAD}(t)_{AVG\_DET} = N_S/N_P \cdot V_P(t)\__{FB}/R_S$. The target value $i_{TARGET}$ depends on the desired current draw by load 340. In at least one embodiment, the target value itarget represents a desired average load current value $i_{LOAD}(t)\__{AVG}$. In at least one embodiment, the desired current draw of load 340 is directly related to a desired brightness of the LEDs of load 340. The desired brightness can be a fixed amount or can be obtained from lighting data received from, for example, a dimmer or external brightness detector. Because of the relationships among signals of the primary-side 346 and secondary-side 348, such as the relationships depicted in Equations [1] through [6], the particular manner of generating the switch control signals $G_0$ and $G_1$ to set a value, e.g. $i_{LOAD}(t)_{AVG}$, of the secondary-side current based on the primary-side signal value, e.g. $V_P(t)\__{FB}$ is a matter of design choice.

The push-pull circuit 316 may have imbalances that would cause the primary-side current $i_P(t)$ to have a waveform that varies depending upon when switch 328 conducts and when switch 330 conducts. Imbalances in push-pull circuit 316 can cause the secondary voltage $V_S$ to fluctuate some relative to the depiction of secondary voltage $V_S$ in FIG. 4. Imbalances can be caused by, for example, mismatched characteristics of switches 328 and 330. In at least one embodiment, secondary-side current controller 344 compensates for the imbalances so that secondary voltage $V_S$ generally behaves as depicted in FIG. 4. The primary-side current $i_P(t)$ signal 604 depicts an exemplary imbalance caused by, for example, an on-time resistance of switch 330 being higher than an on-time resistance of switch 328. Push-pull circuit 316 includes a compensator 606 to compensate for imbalances in push-pull circuit 316 to, for example, prevent saturation of transformer 318. The compensator has two signal paths. The first signal path includes proportional-integrator (PI) 608. PI 608 generates an output signal $i_{LOAD}(t)\__{PI}$ that smoothly responds to changes in comparison signal $i_{LOAD}(t)_{AVG\_COMP}$ to guard against abrupt changes in comparison signal $i_{LOAD}(t)_{AVG\_COMP}$ and, thus, abrupt changes in the average value $i_{LOAD}(t)_{AVG}$ of secondary-side current $i_{LOAD}(t)$.

In at least one embodiment, the compensator 606 compensates for imbalances by decreasing the duty cycle of switch control signal $G_0$ (or, equivalently, increasing the duty cycle of switch control signal $G_1$) relative to the duty cycle of switch control signal $G_1$ if the feedback voltage $V_P(t)\__{FB}$ indicates that the primary-side current $i_P(t)$ has a higher value when switch 328 is ON than when switch 330 is ON. Likewise, in at least one embodiment, the compensator 606 compensates for imbalances by decreasing the duty cycle of switch control signal $G_1$ (or, equivalently, increasing the duty cycle of switch control signal $G_0$) relative to the duty cycle of switch control signal $G_0$ if the feedback voltage $V_P(t)\__{FB}$ indicates that the primary-side current $i_P(t)$ has a higher value when switch 330 is ON than when switch 328 is ON.

The second signal path includes a multiplier 610 that alternately multiplies the comparison signal $i_{LOAD}(t)_{AVG\_COMP}$ by alternating sequences of 1 and (−1) at the frequency of switch control signals $G_0$ and $G_1$. The imbalance output signal IMB of multiplier 610 represents a difference in the primary-side current $i_P(t)$ from respective pulses of switch control signals $G_0$ and $G_1$. PI 612 generates signal IMB_PI which smoothes abrupt changes in the imbalance output signal IMB. Multiplier 614 multiplies signal IMB_PI by 1 when generating switch control sign $G_0$ and by −1 when generating switch control signal $G_1$ to generate imbalance correction signal IMB_C. Adder 616 adds output signal $i_{LOAD}(t)\__{PI}$ and imbalance correction signal IMB_C to generate a desired pulse width signal G_PW of the switch control signals $G_0$ and $G_1$. Delta sigma modulator 618 processes the desired pulse width signal G_PW to shift noise in the pulse width signal G_PW out of a baseband of switch control signals $G_0$ and $G_1$. Pulse width modulator 620 converts the modulated output signal GPW_A into a pulse width modulated signal. Pulse width modulator 620 generates the modulated output signal GPW at twice the frequency of switch control signals $G_0$ and $G_1$. Flip-flop 622 is connected to AND gates 624 and 626 to alternately enable the outputs of AND gates 624 and 626. Thus, the modulated output signal GPW alternately becomes switch control signal $G_0$ and switch control signal $G_1$.

Referring to FIG. 3, in at least one embodiment, controller 304 can also utilize the primary-side signal value, e.g. voltage $V_P(t)\__{FB}$, to control link voltage $V_L$ alone or together with controlling switch control signals $G_0$ and $G_1$ in order to set a value of the secondary-side current $i_{LOAD}(t)$. Melanson I describes an exemplary process for regulating the link voltage $V_L$.

Figure 7:
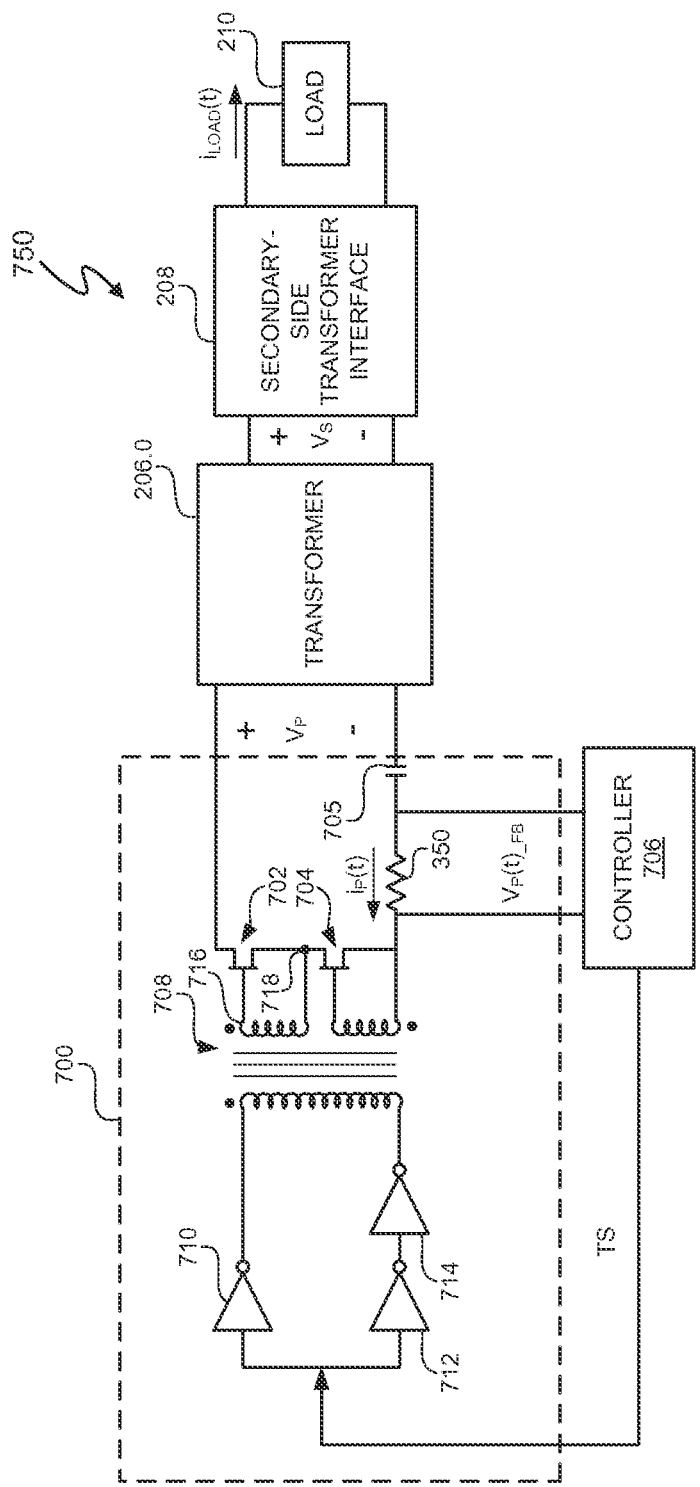
FIG. 7 depicts a power control system with an exemplary half-bridge primary-side transformer interface.

The particular type of primary-side transfer interface 204 is a matter of design choice. FIG. 7 depicts power control system 750 with a half-bridge primary-side transfer interface 700. Half-bridge primary-side transfer interface 700 represents one embodiment of the primary-side interface 204. N-channel FETs 702 and 704 operate as switches and are alternately turned ON and OFF with both transistors 702 and 704 being OFF immediately following each ON time. Capacitor 705 is sufficiently large to maintain an approximately constant capacitor voltage. The primary-side current $i_P(t)$ develops the voltage $V_P(t)\__{FB}$ across sense resistor 350, and controller 706 generates a pulse width modulated control signal TS. Control signal TS is applied to the input terminal of inverter 710 and to the input terminal of inverter 712. Inverter 712 is serially connected to inverter 714 so that the input to inverter 712 is the same as the output of inverter 714. Transformer 708 induces a voltage in a secondary-side 716 of transformer 708 when control signal TS is LOW sufficient to turn transistor 702 ON. Transformer 708 induces a voltage for a secondary-side 716 sufficient when control signal TS is HIGH and sufficient to turn transistor 704 ON. In at least one embodiment, transistors 702 and 704 are isolated from controller 706 to provide stability to voltage node 718. Controller 706 adjusts the pulse width and duty cycle of control signal TS to compensate for imbalance and to control the primary-side voltage $V_P$ and, thus, control the secondary-side current $i_{LOAD}(t)$ based on the primary-side signal value voltage $V_P(t)\_{FB}$.

Figure 8:
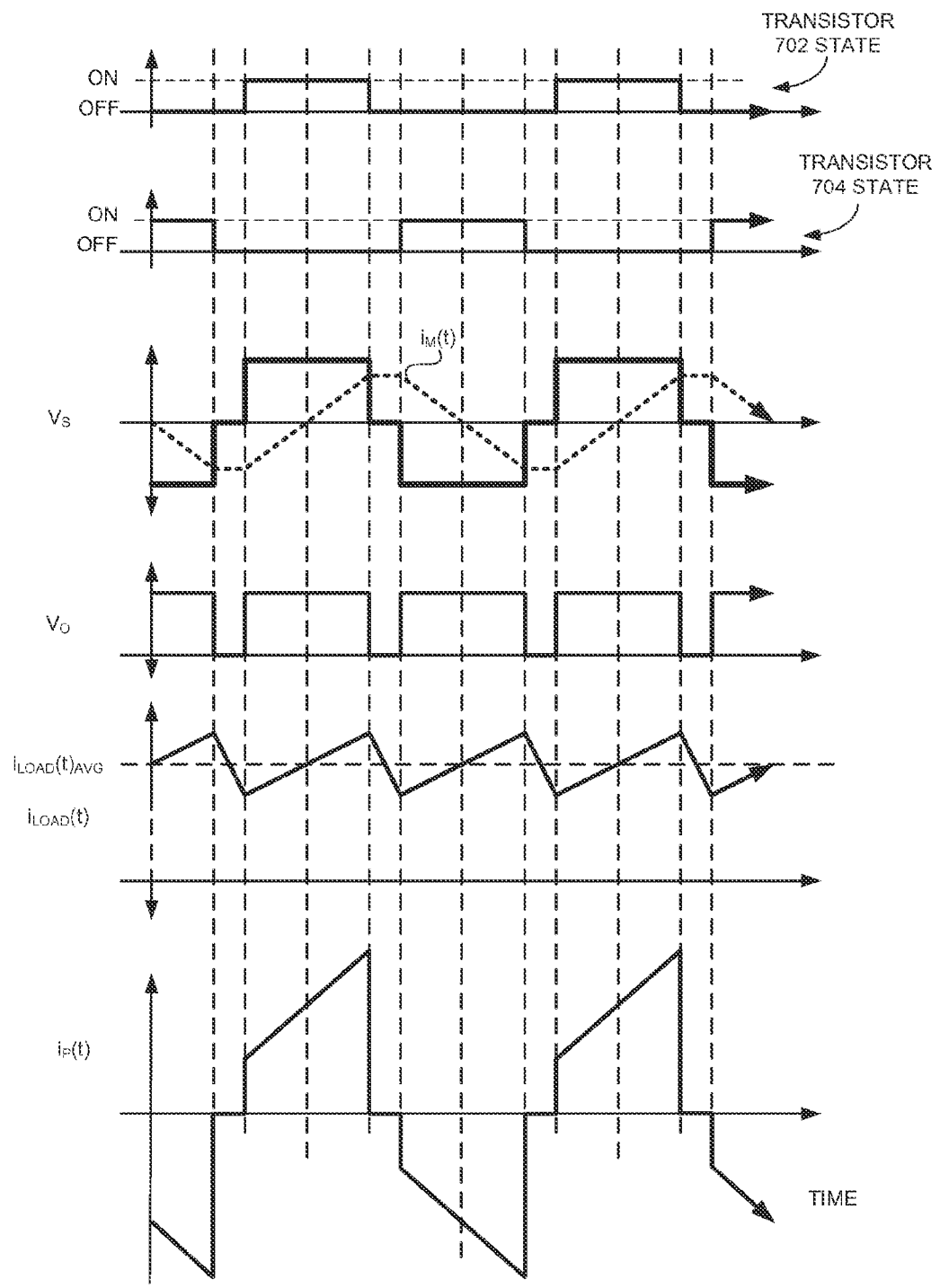
FIG. 8 depicts signal waveforms for the system of FIG. 7.

FIG. 8 depicts exemplary signals in power control system 750. The primary-side current $i_P(t)$ is inverted when transistor 704 is ON. Thus, Equation [6] is valid when transistor 702 is ON, and the primary-side current $i_P(t)$ is related to the secondary-side current average value $i_{LOAD}(t)_{AVG}$ in accordance with Equation [9]:

$$i_{LOAD}(t)_{AVG} \cdot N_S = -i_P(t) N_P \qquad [9].$$

In at least one embodiment, transformer 720 has one primary-side winding and one secondary-side winding. In at least one embodiment, an additional secondary winding (not shown) provides auxiliary power for controller 706.

Figure 9:
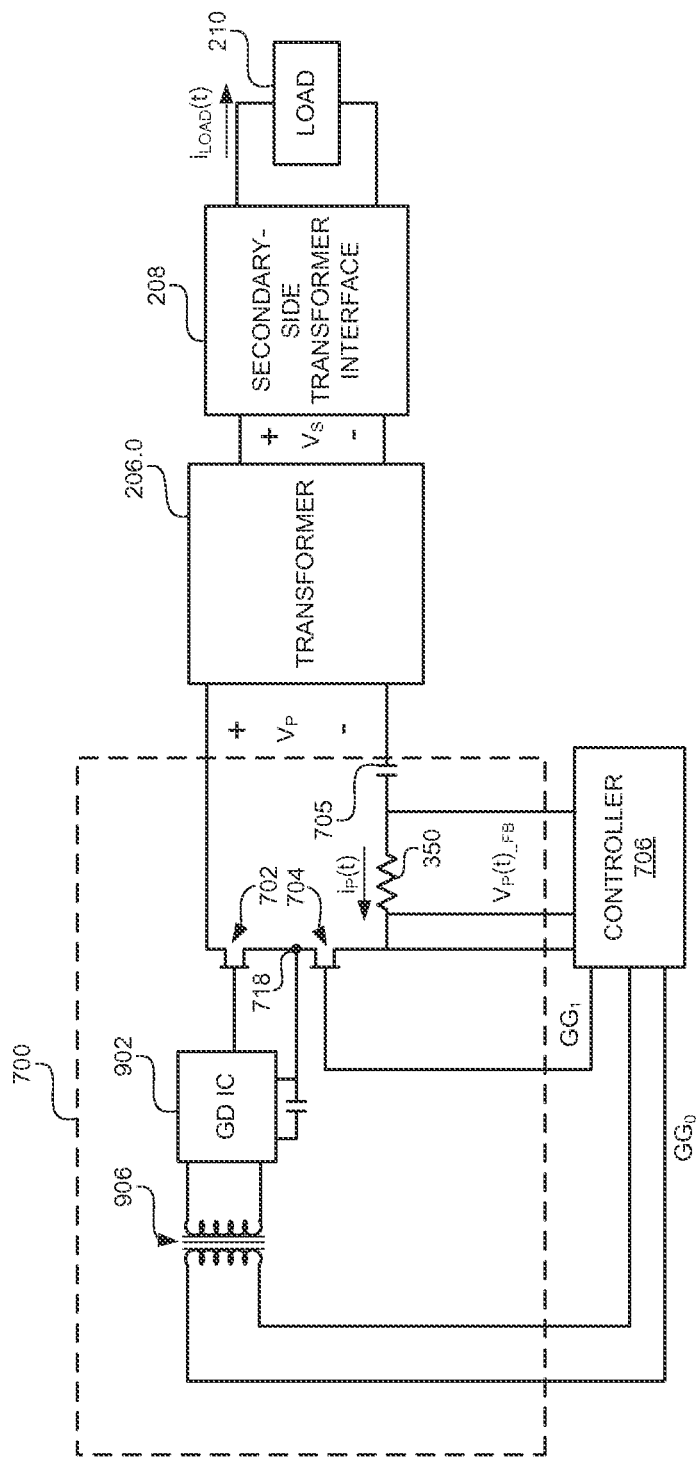
FIG. 9 depicts a power control system with an exemplary half-bridge primary-side transformer interface.

FIG. 9 depicts embodiment of a half-bridge primary-side interface 900, which represents an additional embodiment of primary-side interface 204. Half-bridge primary-side interface 900 operates the same as half-bridge primary-side transfer interfaces 700 except that interface 900 includes a gate drive integrated circuit (IC) 902 to drive transistor 702. The gate drive IC 902 is coupled to the controller 904 via a transformer 906, and transistor 704 is directly coupled to gate drive circuitry internal to controller 904. Half bridge driver part number IR2111 by Internal Rectifier of California, USA, represents one embodiment gate drive IC 902. Controller 904 operates in the same manner as controller 706 except that separate gate drive signals $GG_0$ and $GG_1$ are developed having the same waveform as the respective output signals of inverters 710 and 714 of power control system 750 shown in FIG. 7.

Although several, exemplary primary-side transformer interfaces have been described, the selection of a primary-side transformer interface is a matter of design choice. Regardless of the type of primary-side transformer interface, at least one secondary-side current value, such as the average value $i_{LOAD}(t)_{AVG}$ of a secondary-side current $i_{LOAD}(t)$, can be determined or implied from a primary-side signal value, such as voltage $V_P(t)\_{FB}$. In at least one embodiment, the average secondary-side current value $i_{LOAD}(t)_{AVG}$ can be implied by the relationship in Equation [6] when the magnetizing current is zero.

Figure 10:
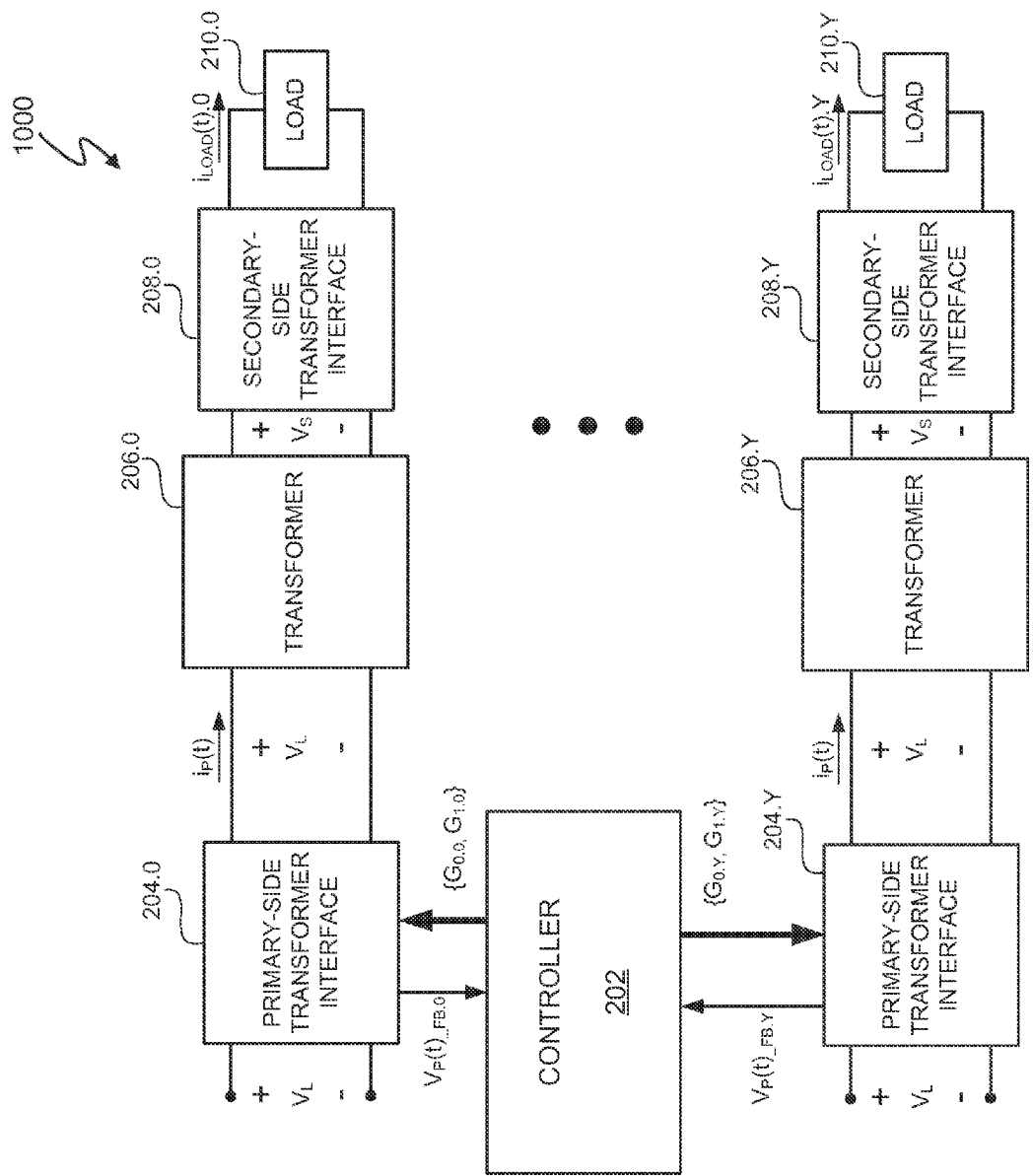
FIG. 10 depicts a power control system with multiple loads.

FIG. 10 depicts power control system 1000 having multiple loads 210.0-210.Y, where Y+1 represents the number of loads and Y is a positive integer. In at least one embodiment, controller 202 generates each set of switch control signals $\{G_{0.0}, G_{1.0}\} \ldots \{G_{0.Y}, G_{1.Y}\}$ in the same manner as the generation of switch state control signals $G_0$ and $G_1$ by controller 304 in FIG. 3. Thus, controller 202 can control multiple secondary-side output currents $i_{LOAD}(t).0 \ldots i_{LOAD}(t).Y$ based on respective primary-side signal values, such as voltages $V_P(t)\_{FB.0} \ldots V_P(t)\_{FB.Y}$. Additionally, although a single link voltage $V_L$ is depicted, different link voltages could be supplied to primary-side transformer interfaces 204.0 . . . 204.Y.

Thus, in at least one embodiment, an electronic system includes a transformer. In at least one embodiment, a controller is configured to regulate a current on a secondary-side of the transformer based on a primary-side signal value. In at least one embodiment, the primary-side signal value is a sample of the primary-side transformer current and the secondary-side current is a current to a load, and, in at least one embodiment, the controller does not receive feedback from the secondary-side of the transformer. In at least one embodiment, the load includes one or more LEDs.

Although the present invention has been described in detail, it should be understood that various changes, substitutions and alterations can be made hereto without departing from the spirit and scope of the invention as defined by the appended claims.

What is claimed is:

1. An apparatus comprising:
   a controller to (i) receive a feedback signal from a primary-side of a transformer, wherein the feedback signal represents a current in the primary-side of the transformer (ii) to generate one or more duty cycle modulated switch control signals to control a voltage on a primary-side of the transformer to regulate a load current on a secondary-side of the transformer to an approximately average value based on the feedback signal from the primary-side of the transformer without using a feedback signal from a secondary-side of the transformer, and (iii) to compensate for imbalances in a primary-side interface of the transformer.

2. The apparatus of claim 1 wherein the controller is further configured to:
   process the feedback signal to eliminate influence of a magnetizing current of the transformer.

3. The apparatus of claim 1 wherein the controller is configured to generate the one or more duty cycle modulated switch control signals based on a value of the primary-side signal value occurring at a sampling time during a period of at least one of the switch control signals.

4. The apparatus of claim 3 wherein the primary-side signal value represents a current in the primary-side of the transformer and the sampling time is when an average value of the current in the primary-side is reached.

5. The apparatus of claim 3 wherein the primary-side signal value represents a current in the primary-side of the transformer and the sampling time corresponds to a midpoint during a pulse of at least one of the switch control signals.

6. The apparatus of claim 1 wherein the controller is configured to generate switch control signals to control a push-pull circuit of the primary-side interface of the transformer.

7. The apparatus of claim 6 wherein the controller is configured to compensate for imbalances in a primary-side interface of the transformer by decreasing or increasing a duty cycle of a first of the switch control signals relative to a duty cycle of a second of the switch control signals.

8. The apparatus of claim 1 further comprising:
   the transformer, coupled to the controller; and
   a load coupled to the transformer.

9. The apparatus of claim 1 wherein the load comprises one or more light emitting diodes.

10. A method comprising:
    receiving a feedback signal from a primary-side of a transformer, wherein the feedback signal represents a current in the primary-side of the transformer;
    generating control signals for circuitry coupled to the primary-side of the transformer to regulate a load current on a secondary-side of the transformer to an approximately average value based on the feedback signal from the primary-side of the transformer without using a feedback signal from a secondary-side of the transformer; and
    compensating for imbalances in a primary-side interface of the transformer.

11. The method of claim 10 further comprising:
    processing the feedback signal to eliminate influence of a magnetizing current of the transformer.

12. The method of claim 10 wherein generating control signals comprises generating the one or more switch control signals based on a value of the primary-side signal value occurring at a sampling time during a period of at least one of the switch control signals.

13. The method of claim 10 wherein the primary-side signal value represents a current in the primary-side of the transformer and the sampling time is when an average value of the current in the primary-side is reached.

14. The method of claim 10 wherein the primary-side signal value represents a current in the primary-side of the transformer and the sampling time corresponds to a midpoint during a pulse of at least one of the one or more control signals.

15. The method of claim 10 wherein the controller is configured to generate switch control signals to control a push-pull circuit of the primary-side interface of the transformer.

16. The method of claim 15 wherein the controller is configured to compensate for imbalances in a primary-side interface of the transformer by decreasing or increasing a duty cycle of a first of the switch control signals relative to a duty cycle of a second of the switch control signals.

17. The method of claim 10 further comprising:

receiving the load current by a load.

18. The method of claim 17 wherein the load comprises one or more light emitting diodes.

19. An apparatus comprising:

means for receiving a feedback signal from a primary-side of a transformer, wherein the feedback signal represents a current in the primary-side of the transformer;

means for generating control signals for circuitry coupled to the primary-side of the transformer to regulate a load current on a secondary-side of the transformer to an approximately average value based on the feedback signal from the primary-side of the transformer without using a feedback signal from a secondary-side of the transformer; and means for compensating for imbalances in a primary-side interface of the transformer.

20. An apparatus comprising:

means for regulating a load current to a load coupled to a secondary-side of a transformer to an approximately average value based on an observed primary-side signal value, wherein the means for regulating the output current comprises:

means for generating one or more duty cycle modulated switch control signals to control a voltage on a primary-side of the transformer based on the primary-side signal value; and means for compensating for imbalances in a primary-side interface of the transformer and the load current represents a current into the load and out of a filter coupled to a rectifier coupled to the secondary-side of the transformer.

* * * * *